(12) United States Patent
Gandza

(10) Patent No.: US 8,393,154 B2
(45) Date of Patent: Mar. 12, 2013

(54) FUEL DELIVERY SYSTEM WITH REDUCED HEAT TRANSFER TO FUEL MANIFOLD SEAL

(75) Inventor: Victor Gandza, Bolton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 849 days.

(21) Appl. No.: 12/370,005

(22) Filed: Feb. 12, 2009

(65) Prior Publication Data

US 2010/0199676 A1 Aug. 12, 2010

(51) Int. Cl.
*F02C 1/00* (2006.01)
*F02C 7/20* (2006.01)

(52) U.S. Cl. ............... 60/739; 60/796; 60/800

(58) Field of Classification Search .......... 60/734, 60/739, 746, 796, 800
See application file for complete search history.

(56) References Cited

U.S. PATENT DOCUMENTS

| | | | |
|---|---|---|---|
| 2,690,648 A | 10/1954 | Pearce et al. | |
| 2,970,438 A | 2/1961 | Howald | |
| 2,993,338 A | 7/1961 | Wilsted | |
| 3,147,594 A | 9/1964 | Hill et al. | |
| 3,335,567 A | 8/1967 | Hemsworth | |
| 3,472,025 A | 10/1969 | Simmons et al. | |
| 3,516,252 A | 6/1970 | Udell et al. | |
| 3,662,959 A | 5/1972 | Sample, Jr. | |
| 4,028,888 A | 6/1977 | Pilarczyk | |
| 4,034,723 A | 7/1977 | Hamparian | |
| 4,089,306 A | 5/1978 | Goloff | |
| 4,409,791 A | 10/1983 | Jourdain et al. | |
| 4,467,610 A | 8/1984 | Pearson et al. | |
| 4,483,137 A | 11/1984 | Faulkner | |
| 4,708,371 A | 11/1987 | Elsworth et al. | |
| 4,938,418 A | 7/1990 | Halvorsen | |
| 5,031,407 A | 7/1991 | Zaremba et al. | |
| 5,197,288 A | 3/1993 | Newland et al. | |
| 5,269,468 A | 12/1993 | Adiutori | |
| 5,335,490 A | 8/1994 | Johnson et al. | |
| 5,396,763 A | 3/1995 | Mayer et al. | |
| 5,423,178 A | 6/1995 | Mains | |
| 5,444,982 A | 8/1995 | Heberling et al. | |
| 5,540,056 A | 7/1996 | Heberling et al. | |
| 5,577,386 A | 11/1996 | Alary et al. | |
| 5,579,645 A | 12/1996 | Prociw et al. | |
| 5,771,696 A | 6/1998 | Hansel et al. | |
| 6,141,968 A | 11/2000 | Gates et al. | |
| 6,149,075 A | 11/2000 | Moertle et al. | |
| 6,256,995 B1 | 7/2001 | Sampath et al. | |
| 6,357,237 B1 | 3/2002 | Candy et al. | |
| 6,622,383 B1 | 9/2003 | Moertle et al. | |
| 6,814,303 B2 | 11/2004 | Edgar et al. | |
| 6,921,034 B2 | 7/2005 | Koss | |
| 7,168,241 B2 | 1/2007 | Rudelt et al. | |
| 7,617,683 B2 * | 11/2009 | Prociw et al. | 60/739 |
| 2005/0039457 A1 | 2/2005 | Moraes | |

* cited by examiner

*Primary Examiner* — Ehud Gartenberg
*Assistant Examiner* — Arun Goyal
(74) *Attorney, Agent, or Firm* — Norton Rose Canada LLP

(57) ABSTRACT

A gas turbine engine fuel supply assembly which includes a fuel manifold mounted to a casing surrounding a combustor of the engine, and a plurality of fuel nozzles mounted to the fuel manifold. A mating interface between the fuel nozzles and the fuel manifold has at least one sealing element, and at least one aperture defined in the fuel nozzle proximate to the mating interface. The aperture is a non fuel conveying passage, and reduces conductive heat transfer to the sealing element by preventing a direct conductive heat transfer path between a hot region of the fuel nozzle and the sealing element.

13 Claims, 3 Drawing Sheets

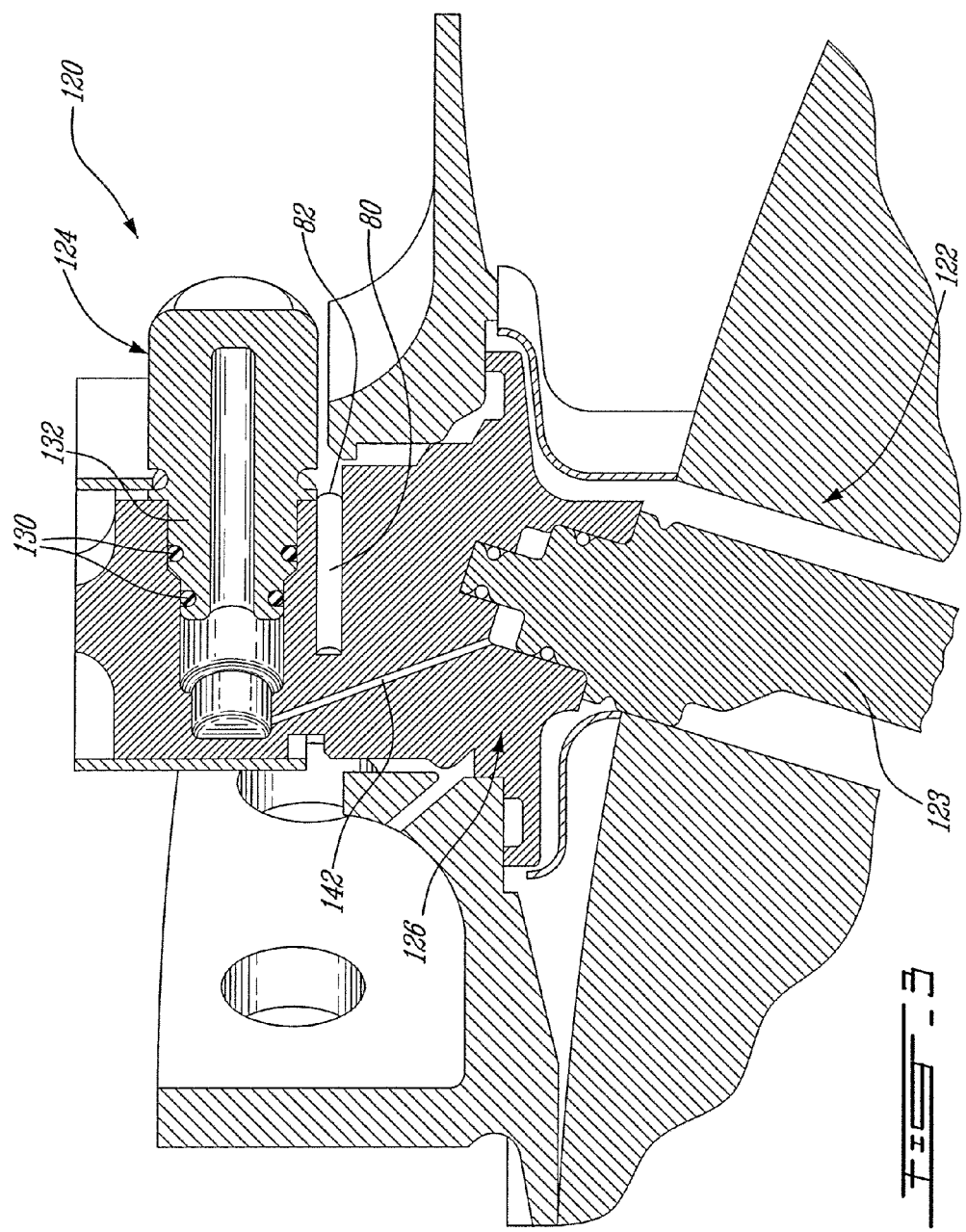

FUEL DELIVERY SYSTEM WITH REDUCED HEAT TRANSFER TO FUEL MANIFOLD SEAL

TECHNICAL FIELD

The invention relates generally to gas turbine engines and, more particularly, to an improved fuel supply assembly for such engines.

BACKGROUND

Fuel supply assemblies for combustors of gas turbine engines are known to include a fuel manifold extending around the combustor's outer casing to supply fuel to a plurality of fuel nozzles which extend into the combustor, through the outer casing, in order to injection fuel and/or air into the combustion chamber. The interconnections between the fuel nozzles and the fuel manifold are sealed, such as by O-ring seals for example, in order to prevent fuel leaks. However, the fuel nozzles which extend into the combustor are exposed to much higher temperatures than the external fuel manifold, and as such heat is transferred from inner ends of the fuel nozzles to the outer ends thereof, proximate the interface with the fuel manifold. Accordingly, the fuel seals at the interface between the fuel nozzles and the fuel manifold can be exposed to high temperatures, leading to deterioration of their sealing capability over time.

SUMMARY

There is therefore provided a fuel supply assembly for a gas turbine engine, comprising: a fuel manifold mounted to a casing surrounding a combustor of the gas turbine engine; and a plurality of fuel nozzles mounted to the fuel manifold in fuel flow communication therewith, a mating interface between the fuel nozzles and the fuel manifold having at least one sealing element therein, at least one aperture defined in each of said fuel nozzles proximate to said mating interface with the fuel manifold, the aperture being a non fuel conveying aperture and having at least a first end thereof open to atmosphere surrounding the fuel nozzle, said aperture reducing conductive heat transfer to said sealing element by preventing a direct conductive heat transfer path between a hot region of the fuel nozzle disposed within said casing and said sealing elements.

In another aspect, there is provided a gas turbine engine including a compressor, a combustor and a turbine, the gas turbine engine comprising: an external fuel manifold disposed outside a casing surrounding the combustor; a plurality of fuel nozzles having a radially outer end mounted to the fuel manifold in fuel flow communication therewith, the fuel nozzles extending through the casing and having a radially inner end for injecting fuel into the combustor, at least one sealing element being disposed at an interface between the fuel manifold and each fuel nozzle; and means for reducing conductive heat transfer between the radially inner end of the fuel nozzle and the radially outer end thereof, such as to protect the sealing elements at the mating joint between the fuel manifold and each fuel nozzle from thermal damage.

There is also provided a method of protecting seals from thermal damage in a fuel supply assembly for a gas turbine engine, the method comprising breaking one or more conductive heat transfer paths between a hot region of a fuel nozzle and a relatively cooler region of a fuel manifold by providing an aperture in a body of the fuel nozzle between said hot and cooler regions, said aperture being located at a position in the body proximate the seals thereby reducing conductive heat transfer thereto.

Further details of these and other aspects will be apparent from the detailed description and figures included below.

BRIEF DESCRIPTION OF THE DRAWINGS

Reference is now made to the accompanying figures, in which:

FIG. 3 is a partial, perspective cross-sectional view of a fuel delivery assembly of a second embodiment, showing an interconnection between a fuel nozzle and the fuel manifold thereof.

DETAILED DESCRIPTION

Figure 1:
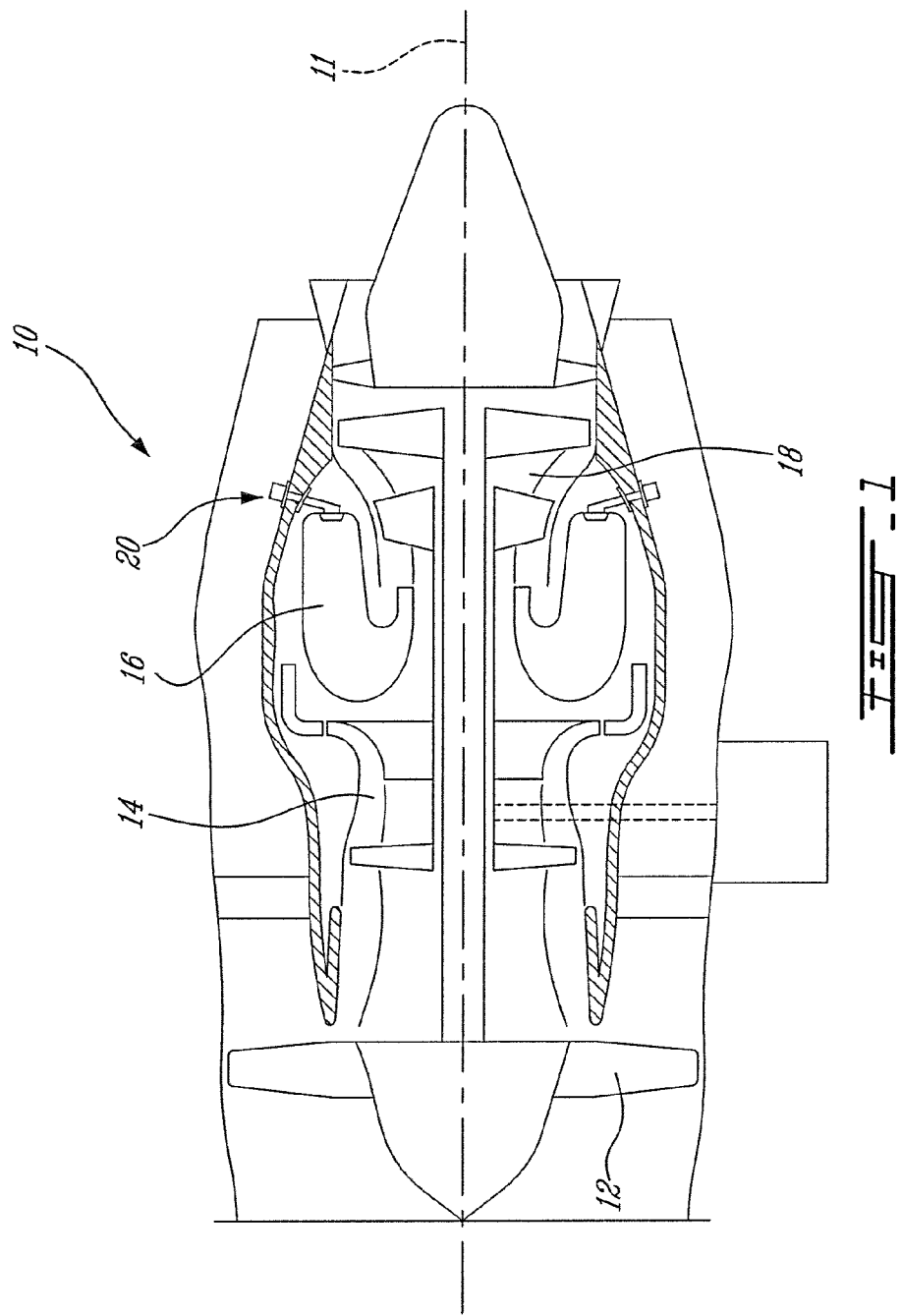
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The fuel is fed within the combustor 16 by means of a fuel supply assembly 20 as will be described.

A longitudinal main engine axis 11 extends through the center of the engine. The terms "longitudinal", "radial" and "circumferential" as used herein are intended to define directions relative to this main engine axis 11.

Figure 2:
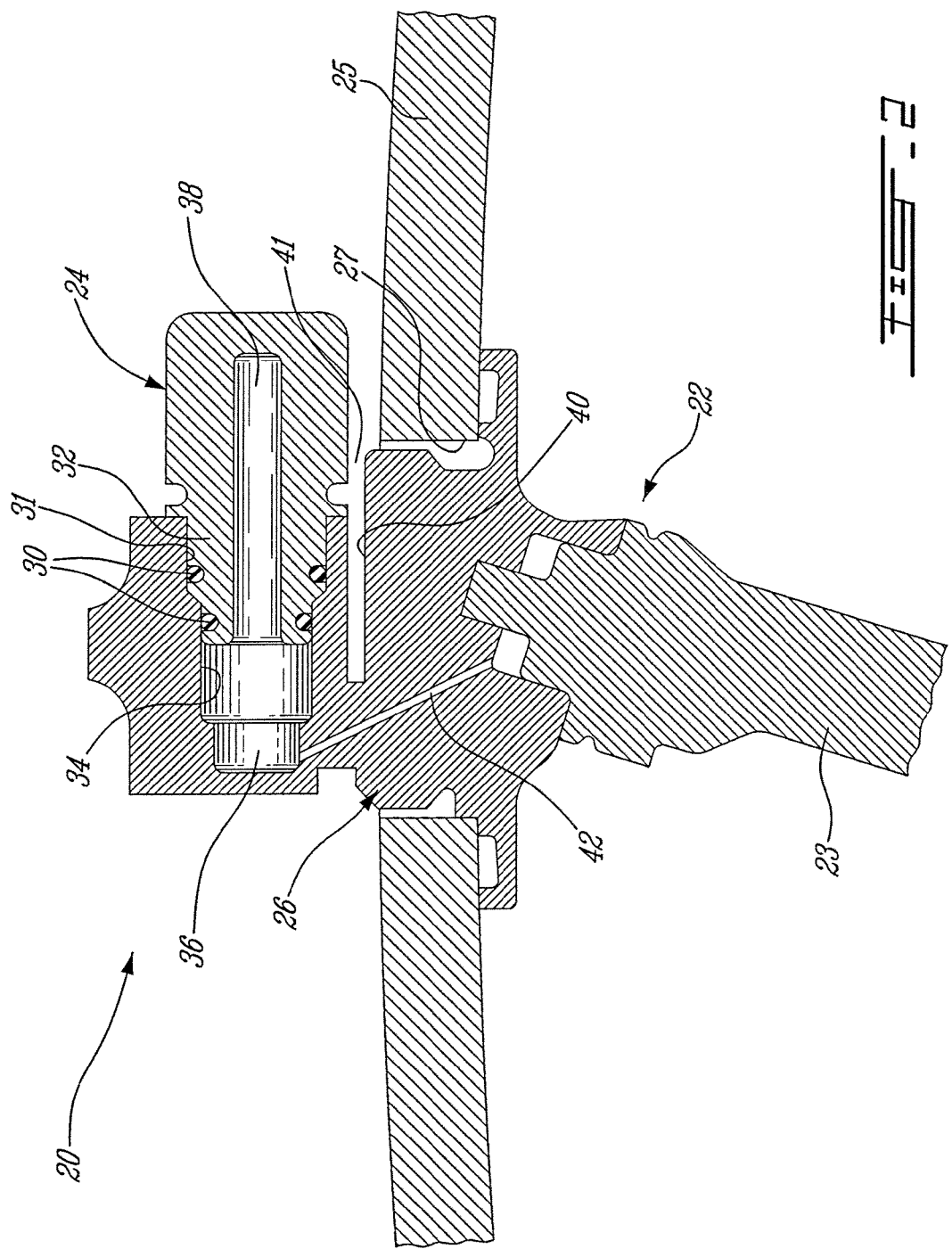
FIG. 2 is a partial, side cross-sectional view of a fuel delivery assembly of a first embodiment, showing an interconnection between a fuel nozzle and the fuel manifold thereof.

Referring to FIG. 2, the fuel delivery assembly 20 includes an external fuel manifold 24 (only a portion of which is visible) disposed outside the combustor casing 25 and a plurality of fuel nozzles 22 connected in fluid communication engagement to the external manifold 24. Each fuel nozzle 22 includes a head portion or retainer member 26 which extends through openings 27 in the casing 25 and a stem portion 23 which extends from the head or retainer member 26 radially inwardly to the combustor 16. The retainer member 26 engages the fuel manifold portion 24 in a sealed manner. The stem portion 23 of each fuel nozzle provides fuel flow communication between the nozzle head/retainer member 24 located outside the casing 25 and fuel spray tips (not shown) which are disposed on the inner ends of the stems 23 and extend into the combustor 16 for injecting fuel into the combustion chamber. Fuel is therefore distributed to each of the fuel nozzles 22 by the external fuel manifold 24 located outside of the combustor casing 25.

Given that the fuel spray tips on the inner ends of the fuel nozzle stems 23 extend into the combustion chamber and also that the fuel nozzles 22 are generally disposed proximate the combustor 16 within the casing 25, they are exposed to high temperatures during the operation of the gas turbine engine. Heat is thus transferred through the nozzle stems 23 out to the retainer members 26 and the fuel manifold 24. This heat transfer is principally conductive in nature. Accordingly, despite being located outside the casing 25, the fuel manifold 24 can nonetheless be exposed to relatively high temperatures as a result of conductive heat transferred from the fuel nozzles 22 engaged therewith.

Although the retainer members 26 of the fuel nozzles 22 may be separate from the fuel nozzle stems 23 (i.e. the two parts are not integrally formed but are fastened together) as shown in the drawings, it is to be understood that the retainer member 26 as described herein can also be integrally formed with the stem portion 23 of the fuel nozzles 22, wherein the retainer member 26 forms an integral nozzle head which is located outside of the casing 25 for engagement with the fuel manifold 24, but which is integrally formed with the stem 23 of the fuel nozzle.

The retainer members 26 are ma tingly engaged with the fuel manifold 24 outside of the casing 25. The fuel manifold 24 may be annular and extend circumferentially about the casing 25, such that the retainer members 26 of each of the plurality of fuel nozzles 22 are circumferentially spaced and radially project out of the casing to engage the annular external fuel manifold 24. The mating interface 31 between the retaining members 26 of the fuel nozzles 22 and the fuel manifold 24 is sealed such as to prevent any fuel leaks. As such, sealing elements 30, such as for example elastomeric polymer O-ring seals, are disposed at this mating interface 31, between the fuel manifold 24 and the retainer members 26 of the fuel nozzles 22. As seen in FIG. 2, for example, the fuel manifold 24 includes an axially projecting fuel passage portion 32 that is received within a correspondingly formed opening 34 in the retainer member 26 of the fuel nozzles 22, such as to interconnect in fuel flow communication a plenum 36 in the retainer member 26 with the fuel passage 38 of the fuel manifold 24 and which at least partially defines the mating interface 31 between the fuel manifold 24 and the retainer members 26 of the fuel nozzles 22. The sealing elements 30 (two such sealing elements in the form of O-rings are shown) are therefore disposed between the outer surface of the axially projecting fuel passage portion 32 of the fuel manifold 24 and the inner surface of the opening 34, along the mating interface 31 within the retainer member 26 of the fuel nozzle 22.

Given that such sealing elements 30 may be less heat resistant than the fuel manifold 24 and the fuel nozzle retainer members 26, for example because the sealing elements are composed of a material that is itself less heat resistant than the solid metallic mating flanges of the manifold and the retainer members or alternately because the sealing elements are simply made of a much thinner cross-sectional area and/or shape, it is desirable to limit heat transfer to these sealing elements 30. This will extend the life span of the sealing elements 30 as they will be exposed to lower temperatures during the operation of the engine, as a result of reduced heat transfer thereto.

In order to reduce the heat transfer, and more specifically the conductive heat transfer from the hotter regions of the fuel nozzles 22 (such as the fuel nozzle stems 23 for example) to the cooler fuel manifold 24, the fuel nozzle retainer member 26 of the fuel nozzles 22 includes a non fuel-conveying aperture formed therein proximate the location of the sealing elements 30, and therefore between the hot regions of the fuel nozzle and the cooler fuel manifold 24. More particularly, the aperture is positioned such as to at least reduce the direct conductive heat transfer to the interface between the fuel manifold 24 and each fuel nozzle 22. This aperture may take the form of one or more slots 40, as shown in FIG. 2, or one or more holes 60, as shown in FIG. 3. The slot 40 and the holes 60 may be formed in the body of the fuel nozzle by a number of possible methods, including machining. The holes 60 may be formed by drilling and the slot may be formed using a multi-axis milling machine, electric discharge machining (EDM), or other suitable machining techniques.

In the case of the embodiment of FIG. 2, the heat transfer reducing slot 40 is located in the body of the fuel nozzle retaining member 26, which itself extends through the combustor casing 25 and is thus disposed between the hot fuel nozzle stem 23 located inside the casing 25 and the cooler fuel manifold 24 located outside the casing 25. However, it is to be understood that the heat transfer reducing slot 40 can also be formed elsewhere in the fuel nozzle assembly 22 or the fuel manifold, provided it is disposed such as to interrupt a direct conductive heat transfer path between the hottest portion of the fuel nozzle and/or fuel manifold and the coolest portion thereof. Regardless of the configuration of the fuel nozzle 22, the heat transfer reducing slot 40 may be disposed near the sealing elements 30 in order to reduce the likelihood of them overheating. Each slot 40 is at least partially open, for example at least one end 41 thereof, thereby allowing cooling air outside the casing 25 to circulate in and through the slot 40, thereby further helping to cool this region of the fuel nozzle assembly. The slot 40 is arcuate and extends at least partially through the solid body of the retainer member in a generally circumferential direction, and may extend completely through the solid body in this circumferential direction (i.e. be open on both longitudinally extending edges of the arcuate slot in addition to the curved open end 41 thereof).

By forming the slot 40 in the solid body of the retainer member 26 of the fuel nozzle 22, the quantity of heat transfer passed through the assembly to the sealing elements 30 at the interface with the fuel manifold 24 is reduced as a result of a number of factors. The first among these is the reduction in the conductive transfer of heat from the solid metallic retainer member 26 to the solid metallic fuel manifold 24. By breaking up, or diverging, the direct conductive heat transfer path between the inner, high temperature region (ex: the fuel nozzle) to the outer region where the sealing elements 30 contact the fuel manifold 24, the slot 40 forces heat between these two regions to flow through the retainer member 26 around the slot. This thereby causes the conductive heat transfer path to be redirected into a region of the retainer member 26 that is closed to a fuel flow passage 42 therein, and therefore a region of the retainer member 26 this is cooled by fuel flowing through this fuel flow passage. The temperature is thus lowered in the general vicinity of the fuel flow passage 42, and therefore the conductive heat transfer between the fuel nozzle 22 and the fuel manifold is reduced as a result of the slot 40 which has redirected the heat into this fuel-cooled region of the assembly. The slot 40, in effect, is formed by the removal of material from the solid body of the fuel nozzle retainer 26, proximate the mating interface with the fuel manifold 24 which is sealed by the sealing elements 30.

Additionally, the slot 40 is formed in the nozzle retainer member 26 at a location thereof that is disposed outside of the combustor casing 25. As such, cooling air with surrounds the combustor casing is allowed to flow and through the slot 40, that is into the solid body of the nozzle retainer 26, thereby providing an additional cooling mechanism, namely the convective cooling of the region of the assembly surrounding the slot 40. This further lowers the temperature of this region, within which the sealing elements 30 are disposed, and thus further aids in the reduction of the heat transfer to the sealing elements 30 at the mating interface with the fuel manifold 24.

The slot 40 may be arcuate and extend circumferentially completely through the fuel nozzle retainer 26, or alternately may extend only partially therethrough in a tangential and/or circumferential direction. Regardless, one such slot 40 is located proximate each of the axially projecting fuel passage portions 32 of the fuel manifold 24 which are sealed in engagement with the fuel nozzle assembly (i.e. with the nozzle retainer member 26) with the sealing elements 30. In other words, therefore, each slot 40 is positioned between the fuel nozzle 22 and the mating surfaces (ex: mounting flanges) between the fuel manifold and the fuel nozzle 22, such as to limit the conductive heat transfer therebetween.

As the retainer member 26 of the fuel nozzle 22 may itself extend fully circumferentially around the combustor casing 25 (i.e. linking the plurality of fuel nozzle stems 23), the slot 40 may similarly be a single circumferentially slot formed therein, which extends about the full circumference of the radially outwardly projecting retainer member 26. The retainer member 26 may also only be disposed atop of each of the fuel nozzle stems 23, in which case a separate slot 40 is defined in each of the retainer members 26.

Referring now to FIG. 3, a fuel delivery system 120 of an alternate embodiment is similar to the fuel delivery system 20 of FIG. 2 described above. The alternate fuel delivery system 120 however differs in that, in lieu of a single arcuate heat transfer reducing slot 40, a series of holes 80 are provided in substantially the same location of the solid body of the retainer member 126 of the fuel nozzle 122. The holes 80 extend through the body of the retainer member in a substantially longitudinal direction (i.e. longitudinal relative to the main engine axis 11). The holes 80 may be circumferentially spaced apart within the retainer member 126, and may be equally spaced apart or alternately may be disposed in bunches as needed depending on regions of higher expected temperature—for example several such holes 80 may be located close together in a region of predetermined high temperature, such as to reduce the conductive heat transfer through the fuel nozzle body between the fuel nozzle stem 123 and the fuel manifold 124, thereby reducing the temperatures to which the sealing elements 130 (ex: o-rings) which seal the connection between the fuel manifold 124 and the fuel nozzle retainer member 126. The diameter and/or length of each such heat transfer reducing hole 80 may be selected as required, for example in order to control the conductive heat transfer path through the solid body of the retainer member 126. As noted above, this may be to redirect the conductive heat transfer path closer to a fuel conduit, such as fuel flow passage 142, which will cool the surrounding body of the retainer member in view of the relative cool fuel flowing therethrough. As per the slots 40 described above, the heat transfer reducing holes 80 is located proximate each of the axially projecting fuel passage portions 132 of the fuel manifold 124 which are sealed in engagement with the fuel nozzle assembly 122 (i.e. with the nozzle retainer member 126) with the sealing elements 130. Each hole 80 is thus positioned between the hot fuel nozzle stem 123 and the relatively cooler mating surfaces (ex: mounting flanges) between the fuel manifold 124 and the fuel nozzle retainer member 126, such as to limit the conductive heat transfer therebetween. The holes 80 therefore act to break, or at least render less direct, the conductive heat transfer path through the solid material making up the body of the fuel nozzle assembly 122 (namely through the retainer member 126 therefore in the depicted embodiments) between each of the fuel nozzle stems and the sealing elements of the fuel manifold.

Although the holes 80 may have a circular cross-sectional area as depicted, other shapes and configurations as possible, for example a hole having an oval, square or rectangular cross-sectional area, as well as a hole have a non-constant diameter, width or cross-sectional area. As per the slots 40 described above, the heat transfer reducing holes 80 are open (for example to atmosphere, =i.e. the region surrounding the fuel manifold) at least one end 82 thereof, such as to allow air to circulate therein—thus further helping to cool this region of the fuel nozzle retainer member body within which the holes 80 are disposed.

The above description is meant to be exemplary only, and one skilled in the art will recognize that changes may be made to the embodiments described without department from the scope of the invention disclosed. For example, although O-rings are described above as being one possible sealing element 30, it is to be understood that other suitable sealing elements which enable the joint or interface between two matingly engaged parts to be sealed such as to prevent liquid leaks (such as, but not necessarily, fuel) therefrom. Other such sealing elements include sealing elements having a C-shaped cross-sectional configuration, split rings, and the like. Further, although FIG. 1 shows a turbofan engine, it is to be understood that the present fuel delivery system can be applied to other types of gas turbine engines, such as turboprop, turboshaft and industrial (i.e. non-airborne) gas turbine engines for example, as well as other fuel system components for such gas turbine engines. For example, the presently described device and method which enables a reduction in heat transfer from a hot portion of the fuel system to a cooler portion thereof may be applied to alternate gas turbine engine components other than the fuel nozzles and fuel manifolds of the presently described fuel delivery system. Additionally, although the slot 40 and holes 80 are described herein as being formed in the fuel nozzle proximate its interface with the fuel manifold, it is to be understood that these apertures (i.e. the slot(s) 40 and holes 80) can also be formed in the body of the fuel manifold if necessary, provided they nevertheless interrupt the conductive heat transfer path between the hot regions of the fuel nozzle and the sealing elements at the interface between the fuel nozzle and the fuel manifold. Still other modifications which fall within the scope of the present invention will be apparent to those skilled in the art, in light of a review of this disclosure, and such modifications are intended to fall within the appended claims.

The invention claimed is:

1. A fuel supply assembly for a gas turbine engine, comprising:
 a fuel manifold mounted to a casing surrounding a combustor of the gas turbine engine; and
 a plurality of fuel nozzles mounted to the fuel manifold in fuel flow communication therewith, an axially extending mating interface between the fuel nozzles and the fuel manifold, the axially extending mating interface extending from a first axial position to a second axial position, at least one sealing element disposed between each of the fuel nozzles and the fuel manifold at a third axial position, the third axial position being axially disposed between the first and second axial positions, at least one aperture defined in each of said fuel nozzles proximate to said mating interface with the fuel manifold, the aperture being a non fuel conveying aperture and defining a radial air gap, the aperture extending axially and having a length defined between a first open aperture end and a second closed aperture end, the first open aperture end being open to atmosphere surrounding the fuel nozzle and proximate the first axial position of the mating interface, the length of the aperture axially spanning the first, second and third axial positions, wherein an axial overlap is provided between said at least one sealing element and the radial air gap defined by the aperture to reduce conductive heat transfer to said sealing element by preventing a direct conductive heat transfer path between a hot region of the fuel nozzle disposed within said casing and said sealing elements.

2. The fuel supply assembly as defined in claim 1, wherein the fuel manifold is an external fuel manifold disposed outside said casing, the fuel nozzles extending through the casing between the external fuel manifold and the hot region of the fuel nozzle.

3. The fuel supply assembly as defined in claim 2, wherein the fuel nozzle includes a retainer member and a stem portion, the retainer member being mounted to the casing and having the mating interface with the fuel manifold, the retainer member defining said aperture therein, the stem portion being fastened to the retainer member and extending inwardly of the casing to the combustor, the stem portion defining said hot region of the fuel nozzle thereon.

4. The fuel supply assembly as defined in claim 1, wherein said aperture is closed at a second end thereof opposite said first end.

5. The fuel supply assembly as defined in claim 1, wherein the sealing element is an O-ring seal.

6. The fuel supply assembly as defined in claim 5, wherein the O-ring seal is made of an elastomeric polymer.

7. The fuel supply assembly as defined in claim 1, wherein the aperture receives cooling air therein.

8. The fuel supply assembly as defined in claim 1, wherein the fuel nozzle includes a fuel flow passage for providing fuel to a fuel nozzle spray tip and being in fuel flow communication with the fuel manifold, the aperture being disposed within fuel nozzle such as to redirect the conductive heat transfer path towards said fuel flow passage.

9. The fuel supply assembly as defined in claim 1, wherein said at least one aperture is a slot formed in a solid body of the fuel nozzle.

10. The fuel supply assembly as defined in claim 9, wherein said slot is an arcuate slot extending at least partially through said solid body in a circumferential direction.

11. The fuel supply assembly as defined in claim 10, wherein said arcuate slot extends fully through said solid body in said circumferential direction.

12. The fuel supply assembly as defined in claim 1, wherein said at least one aperture includes a number of circumferentially spaced apart and longitudinally extending holes formed in a solid body of the fuel nozzle.

13. The fuel supply assembly as defined in claim 12, wherein said holes are equally spaced apart in the solid body of each said fuel nozzle.

* * * * *